(12) United States Patent
Li

(10) Patent No.: US 11,340,409 B1
(45) Date of Patent: May 24, 2022

(54) GH SPLITTER

(71) Applicant: Huizhou Fibercan Industrial Co., Ltd., Huizhou (CN)

(72) Inventor: Yaole Li, Huizhou (CN)

(73) Assignee: Huizhou Fibercan Industrial Co., Ltd., Huizhou (CN)

( * ) Notice: Subject to any disclaimer, the term of this patent is extended or adjusted under 35 U.S.C. 154(b) by 0 days.

(21) Appl. No.: 17/314,111

(22) Filed: May 7, 2021

(30) Foreign Application Priority Data

Dec. 31, 2020 (CN) .......................... 202023305615.5

(51) Int. Cl.
*G02B 6/38* (2006.01)

(52) U.S. Cl.
CPC ......... *G02B 6/3877* (2013.01); *G02B 6/3878* (2013.01)

(58) Field of Classification Search
None
See application file for complete search history.

(56) References Cited

U.S. PATENT DOCUMENTS

| | | | | |
|---|---|---|---|---|
| 4,978,194 A * | 12/1990 | Allen | ................... | H02G 15/117 385/76 |
| 5,915,055 A * | 6/1999 | Bennett | ................ | G02B 6/2551 385/59 |
| 6,326,550 B1 * | 12/2001 | Dyer | ................... | G02B 6/4428 174/93 |
| 7,270,485 B1 * | 9/2007 | Robinson | ............. | G02B 6/4471 385/136 |
| 8,620,130 B2 * | 12/2013 | Cooke | .................. | G02B 6/4465 385/138 |
| 9,395,509 B2 * | 7/2016 | Petersen | .............. | G02B 6/4471 |
| 9,417,420 B2 * | 8/2016 | Fisher | .................. | G02B 6/4477 |
| 2010/0052346 A1 * | 3/2010 | Cooke | .................. | G02B 6/4465 294/86.4 |
| 2015/0301300 A1 * | 10/2015 | Fisher | .................. | G02B 6/4471 385/134 |
| 2015/0370029 A1 * | 12/2015 | Petersen | .............. | G02B 6/4471 385/114 |

* cited by examiner

*Primary Examiner* — Jerry Rahll
(74) *Attorney, Agent, or Firm* — Rahman LLC

(57) ABSTRACT

A GH splitter includes a splitter body including an upper end cover and a lower end cover fastened therewith, a fastening member and a connecting part are correspondingly provided at two sides of the upper and the lower end covers, a positioning hole and a positioning block are correspondingly provided at two ends of the upper and the lower end covers, a clustering tube and a branching tube are respectively provided at a front end and a rear end inside the splitter body, a sealing ring is provided at a front end of the clustering tube, annular protrusions are provided on both sides of the branching tube, the upper and the lower end covers are provided with joint grooves at positions corresponding to the clustering tube and the branching tube. It has convenience in installment and maintenance, firmness in internal structure, not causing the deviation of branch switching.

4 Claims, 3 Drawing Sheets

GH SPLITTER

TECHNICAL FIELD

The present disclosure relates to the technical field of optical cable branching, and more particularly, to a GH splitter.

BACKGROUND

With the rapid development of electronic technology, more and more electronic devices appear in industrial production and daily life, however, the wiring of some circuits is highly inconvenient, especially during the maintenance, the wiring is chaotic and disorderly, which causes a lot of trouble for the maintenance.

The existing optical cable splitters in the market still have some defects, when in use, the sealing performance is poor, and meanwhile, the stabilization effect of some optical cable splitters is poor, the inside of the splitter body is easy to loosen, and there is a deviation of branch switching, which causes the optical fiber, after branching, to be deformed or broken, and most of the existing splitter bodies are fixed by screws, which will increase the difficulty of maintenance and inspection.

SUMMARY

Aiming at the technical defects presenting in the existing technology, the present disclosure provides a GH splitter, which addresses the above technical problems and meets the actual needs. The specific technical solutions are as follows:

A GH splitter, which includes a splitter body, the splitter body includes an upper end cover and a lower end cover that are fastened with each other, a fastening member and a connecting part are correspondingly provided at two sides of the upper end cover and the lower end cover, a positioning hole and a positioning block are correspondingly provided at two ends of the upper end cover and the lower end cover, a clustering tube and a branching tube are respectively provided at a front end inside the splitter body and a rear end inside the splitter body, a sealing ring is provided at a front end of the clustering tube, annular protrusions are provided on both sides of the branching tube, the upper end cover and the lower end cover are provided with joint grooves at positions corresponding to the clustering tube and the branching tube, the clustering tube and the branching tube are connected in the joint groove.

As an improvement of the above solution, one side of the upper end cover is provided with the fastening member and the connecting part, the other side of the upper end cover is alternately provided with the fastening member and the connecting part, the lower end cover is provided with the connecting part and the fastening member at positions corresponding to the fastening member and the connecting part provided on the upper end cover.

As an improvement of the above solution, an extending part is provided at the front end of the clustering tube, and the sealing ring is sleeved at an outer edge of the extending part.

As an improvement of the above solution, the positioning hole and the positioning block are provided at two ends of the upper end cover, the positions of the two ends of the lower end cover corresponding to the positioning hole and the positioning block at the two ends of the upper end cover are provided with the positioning block and the positioning hole that are engaged with them.

As an improvement of the above solution, in notches of the upper end cover and the lower end cover, the joint grooves are provided with annular grooves at positions corresponding to the annular protrusions provided on the branching tube.

The beneficial effects of the present disclosure are: the splitter body includes an upper end cover and a lower end cover that are fastened with each other, a fastening member and a connecting part are correspondingly provided at two sides of the upper end cover and the lower end cover, a positioning hole and a positioning block are correspondingly provided at two ends of the upper end cover and the lower end cover, and a fixing method of fastening connection is used instead of the traditional fixing method of screws, the staggered positioning hole and positioning block can facilitate a rapid positioning, meanwhile, the connection is more tidy, thereby being convenient for installation and maintenance. The front end of the clustering tube is provided with a sealing ring, thereby ensuring the sealing effect of the access port of the optical cable, both sides of the branching tube are provided with annular protrusions, the annular protrusions are engaged in the annular grooves, thereby fixing the branching tube in the splitter body so that it cannot be rotated, and avoiding the deformation or breakage of the optical fiber after branching, making the internal structure of the splitter body not easy to loosen, and will not produce the deviation of branch switching.

Figure 1:
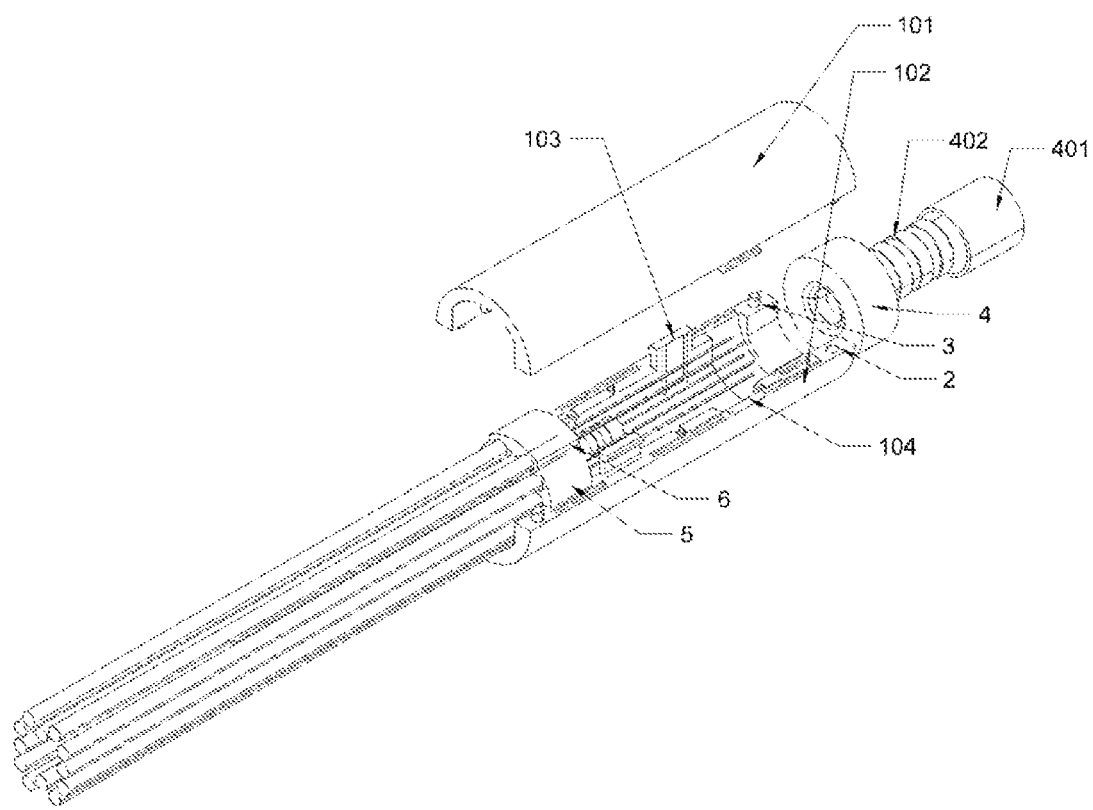
FIG. 1 is a schematic diagram of a structure of the present disclosure.

In which:
1 Splitter body;
101 Upper end cover;
102 Lower end cover;
103 Fastening member;
104 Connecting part;
2 Positioning hole;
3 Positioning block;
4 Clustering tube;
401 Sealing ring;
402 Extending part;
5 Branching tube;
6 Annular protrusion;
7 Joint groove;
8 Annular groove.

DETAILED DESCRIPTION

The following describes the implementation of the present disclosure with reference to the accompanying drawings and related embodiments. It should be pointed out that the following related embodiments are only preferred embodiments for better describing the present disclosure, and the implementation of the present disclosure is not limited to the following embodiments, in addition, the present disclosure relates to some related necessary components in the technical field, and these related necessary components should be regarded as a well-known technology in the art, which can be known and mastered by those skilled in the art.

In the description of the present disclosure, it should be understood that, the terms "lateral", "upper", "lower", "front", "rear", "left", "right", "vertical", "horizontal", "inner", etc. which indicate the orientation or positional relationship based on the orientation or positional relationship shown in the drawings, are only for the purpose of describing the present disclosure and simplifying the description, rather than indicating or implying that the device or element referred to must have a specific orientation, or must be constructed and operated in a specific orientation, and therefore cannot be understood as a limitation of the present disclosure; in addition, the terms "primary" and "secondary" are only used for descriptive purposes, which cannot be understood as indicating or implying relative importance or implicitly indicating the number of the indicated technical features; therefore, the definition of "primary" and "secondary" is only for descriptive purposes, and cannot be understood as indicating or implying relative importance or implicitly including one or more of these features.

As shown in FIG. 1 to FIG. 5, a GH splitter includes a splitter body 1, the splitter body 1 comprises an upper end cover 101 and a lower end cover 102 that are fastened with each other, a fastening member 103 and a connecting part 104 are correspondingly provided at two sides of the upper end cover 101 and the lower end cover 102, a positioning hole 2 and a positioning block 3 are correspondingly provided at two ends of the upper end cover 101 and the lower end cover 102, a clustering tube 4 and a branching tube 5 are respectively provided at a front end inside the splitter body 1 and a rear end inside the splitter body 1, a sealing ring 401 is provided at a front end of the clustering tube 4, annular protrusions 6 are provided on both sides of the branching tube 5, the upper end cover 101 and the lower end cover 102 are provided with joint grooves 7 at positions corresponding to the clustering tube 4 and the branching tube 5, the clustering tube 4 and the branching tube 5 are connected in the joint groove 7.

As shown in FIG. 1, further, in the above solution, one side of the upper end cover 101 is provided with the fastening member 103 and the connecting part 104, the other side of the upper end cover 101 is alternately provided with the fastening member 103 and the connecting part 104, the lower end cover 102 is provided with the connecting part 104 and the fastening member 103 at positions corresponding to the fastening member 103 and the connecting part 104 provided on the upper end cover 101.

As shown in FIG. 1, furthermore, in the above solution, an extending part 402 is provided at the front end of the clustering tube 4, and the sealing ring 401 is sleeved at an outer edge of the extending part 402.

As shown in FIG. 1, furthermore, in the above solution, the positioning hole 2 and the positioning block 3 are provided at two ends of the upper end cover 101, the positions of the two ends of the lower end cover 102 corresponding to the positioning hole 2 and the positioning block 3 at the two ends of the upper end cover 101 are provided with the positioning block 3 and the positioning hole 2 that are engaged with them.

Figure 2:
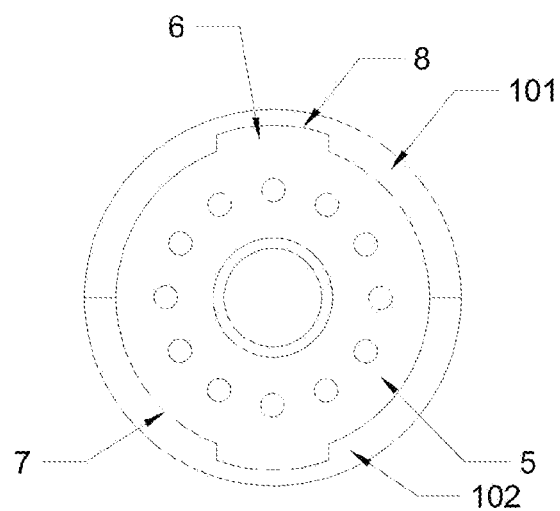
FIG. 2 is a schematic diagram of a first structure at the position of the branching tube of the present disclosure.
Figure 3:
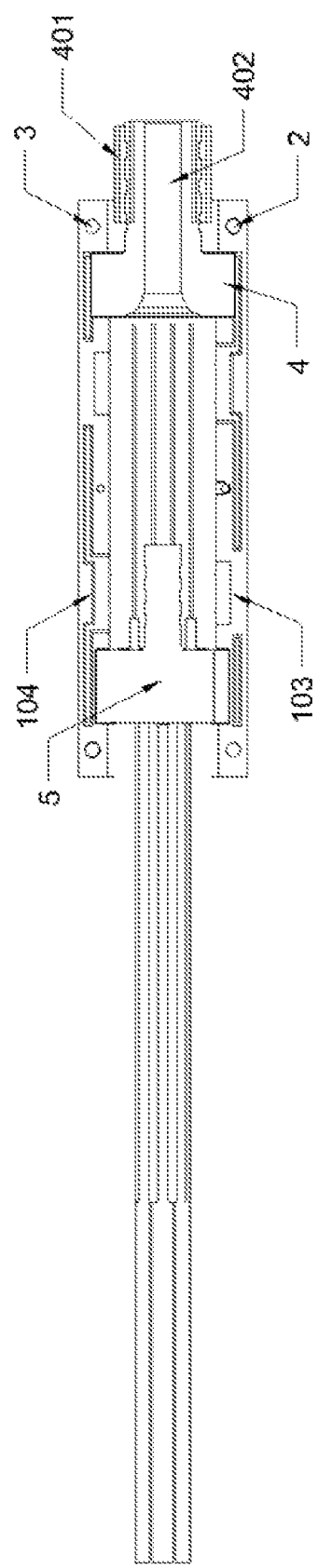
FIG. 3 is a schematic diagram of an internal structure of the present disclosure.

As shown in FIG. 2, further, in the above solution, in notches of the upper end cover 101 and the lower end cover 102, the joint grooves 7 are provided with annular grooves 8 at positions corresponding to the annular protrusions 6 provided on the branching tube 5.

Figure 5:
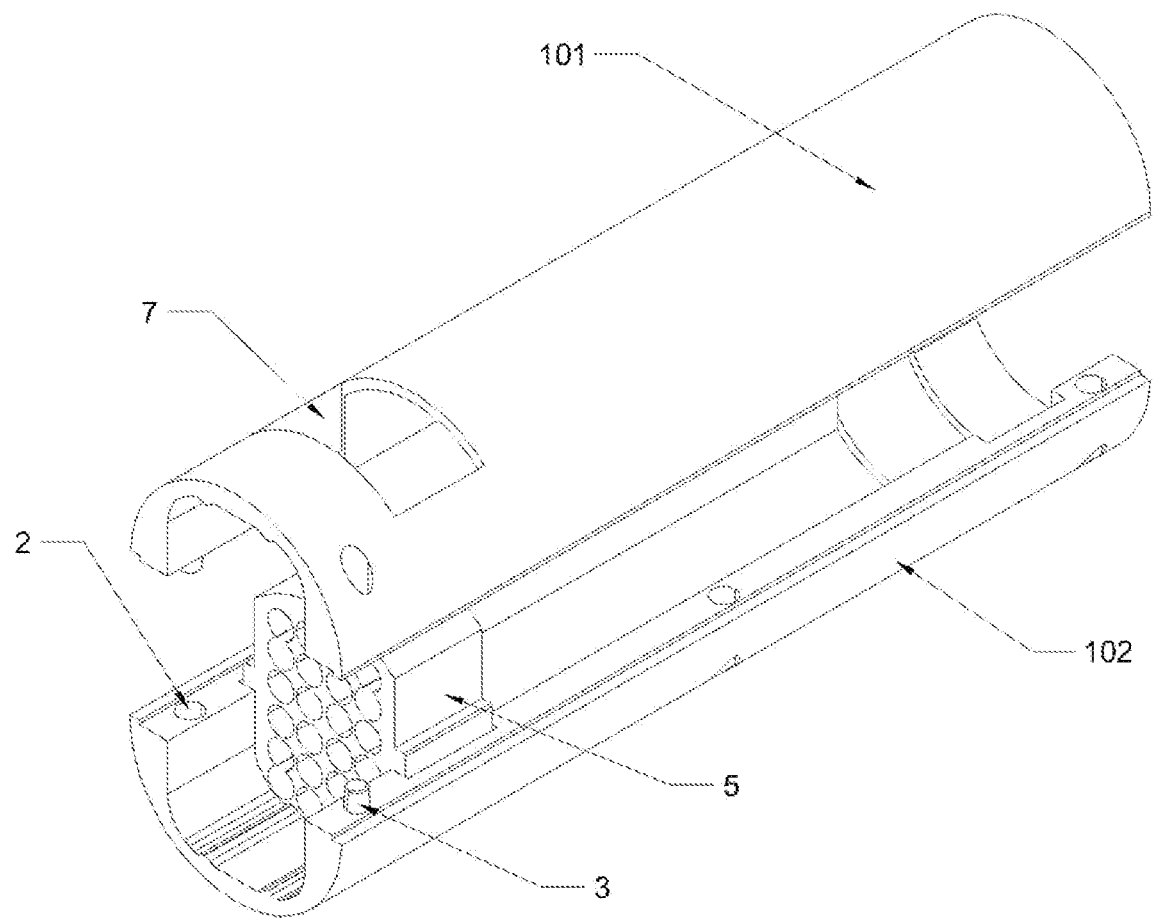
FIG. 5 is a schematic structural diagram of an embodiment of the present disclosure.

As shown in FIG. 1 and FIG. 5, the external structure of the present disclosure is shown, the two sides of the upper end cover 101 and the lower end cover 102 are correspondingly provided with the fastening member 103 and the connecting part 104, the fixing method of fastening connection is used to replace the traditional fixing method of screws, and the staggered positioning hole 2 and positioning block 3 can be used to facilitate rapid positioning, meanwhile, the connection is more tidy, thereby being convenient for installation and maintenance. The fastening member 103 and the connecting part 104 are cross-distributed and fastened to each other, thereby the upper end cover 101 and the lower end cover 102 can fit more closely.

Figure 4:
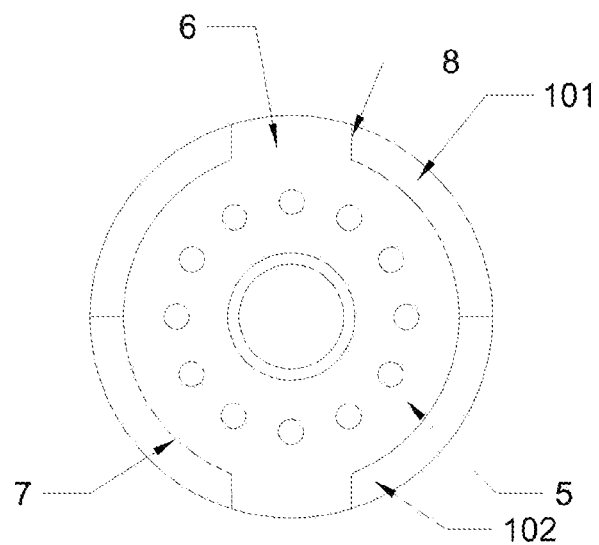
FIG. 4 is a schematic diagram of a second structure at the position of the branching tube of the present disclosure.

As shown in FIG. 1, FIG. 2 and FIG. 4, the internal structure of the present disclosure is shown, the sealing ring 401 is sleeved on the outer edge of the extending part 402 to ensure the sealing effect of the access port of the optical cable. Both sides of the branching tube 5 are provided with the annular protrusions 6, the clustering tube 4 and the branching tube 5 are connected in the joint grooves 7, and the joint grooves 7 are provided with the annular grooves 8 at positions corresponding to the annular protrusions 6 provided on the branching tube 5 in the notches of the upper end cover 101 and the lower end cover 102, the annular protrusions 6 are engaged in the annular grooves 8 to fix the branching tube 5 in the splitter body 1 so that it cannot be rotated, so as to prevent the optical fiber from being deformed or broken after branching, thereby the inside of the splitter body 1 being not easy to loosen, and will not cause the deviation of branch switching.

It should be noted that, as shown in FIG. 4, the depth of the joint groove 7 at the top end of the upper end cover 101 and the bottom end of the lower end cover 102 may extend to penetrate the upper end cover 101 and the lower end cover 102, the top end of the annular protrusion 6 provided on the branching tube 5 is flush with the surface of the upper end cover 101 or the lower end cover 102.

It should be noted that, as shown in FIG. 5, in the structure of the present disclosure, the upper end cover 101 and the lower end cover 102 may be directly connected and fixed using the fastening member 103 and the connecting part 104, or may be directly connected and fixed using the positioning hole 2 and the positioning block 3. Alternatively, the fastening member 103 is used to cooperate with the connecting part 104 and the positioning block 3 to cooperate with the positioning hole 2 for connection and fixation at the same time.

It should be noted that, the clustering tube 4 can be replaced with other clustering tubes 4 for different outer diameters of optical cables, the branching tube 5 can be replaced with other branching tubes 5 for different numbers of cores, a limiting block can be installed on the outer edge of the clustering tube 4 to limit the rotation of the clustering tube 4.

The above are only the preferred embodiments of the present disclosure. It should be pointed out that for those of ordinary skill in the art, without departing from the principle of the present disclosure, several improvements and modifications can be made, and these improvements and modifications should also be regarded as the protection scope of the present disclosure.

What is claimed is:

1. A GH splitter, comprising a splitter body comprising an upper end cover and a lower end cover that are fastened with each other, a fastening member and a connecting part are correspondingly provided at two sides of the upper end cover and the lower end cover, a positioning hole and a positioning block are correspondingly provided at two ends of the upper end cover and the lower end cover, a clustering tube and a branching tube are respectively provided at a front end inside the splitter body and a rear end inside the splitter body, wherein an extending part is provided at a front end of the clustering tube, and a sealing ring is sleeved at an outer edge of the extending part, annular protrusions are provided on both sides of the branching tube, the upper end cover and the lower end cover are provided with joint grooves at positions corresponding to the clustering tube and the branching tube, the clustering tube and the branching tube are connected in the joint groove.

2. The GH splitter according to claim 1, wherein two sides of the upper end cover are both provided with the fastening member and the connecting part, wherein the fastening member and the connecting part on one side correspond to the fastening member and the connecting part on the other side in a cross-distributed manner, and the lower end cover is provided with the connecting part and the fastening member at positions corresponding to the fastening member and the connecting part provided on the upper end cover.

3. The GH splitter according to claim 1, wherein the positioning hole and the positioning block are provided at two ends of the upper end cover, the positions of the two ends of the lower end cover corresponding to the positioning hole and the positioning block at the two ends of the upper end cover are provided with the positioning block and the positioning hole that are engaged with them.

4. The GH splitter according to claim 1, wherein the joint grooves are provided with annular grooves at positions corresponding to the annular protrusions provided on the branching tube in notches of the upper end cover and the lower end cover.

* * * * *